Jan. 19, 1971  P. A. ALDINGER  3,556,564
INDICATING APPARATUS

Filed Oct. 1, 1968  2 Sheets-Sheet 1

INVENTOR.
PAUL A. ALDINGER
BY John Shaw Stevenson
AGENT.

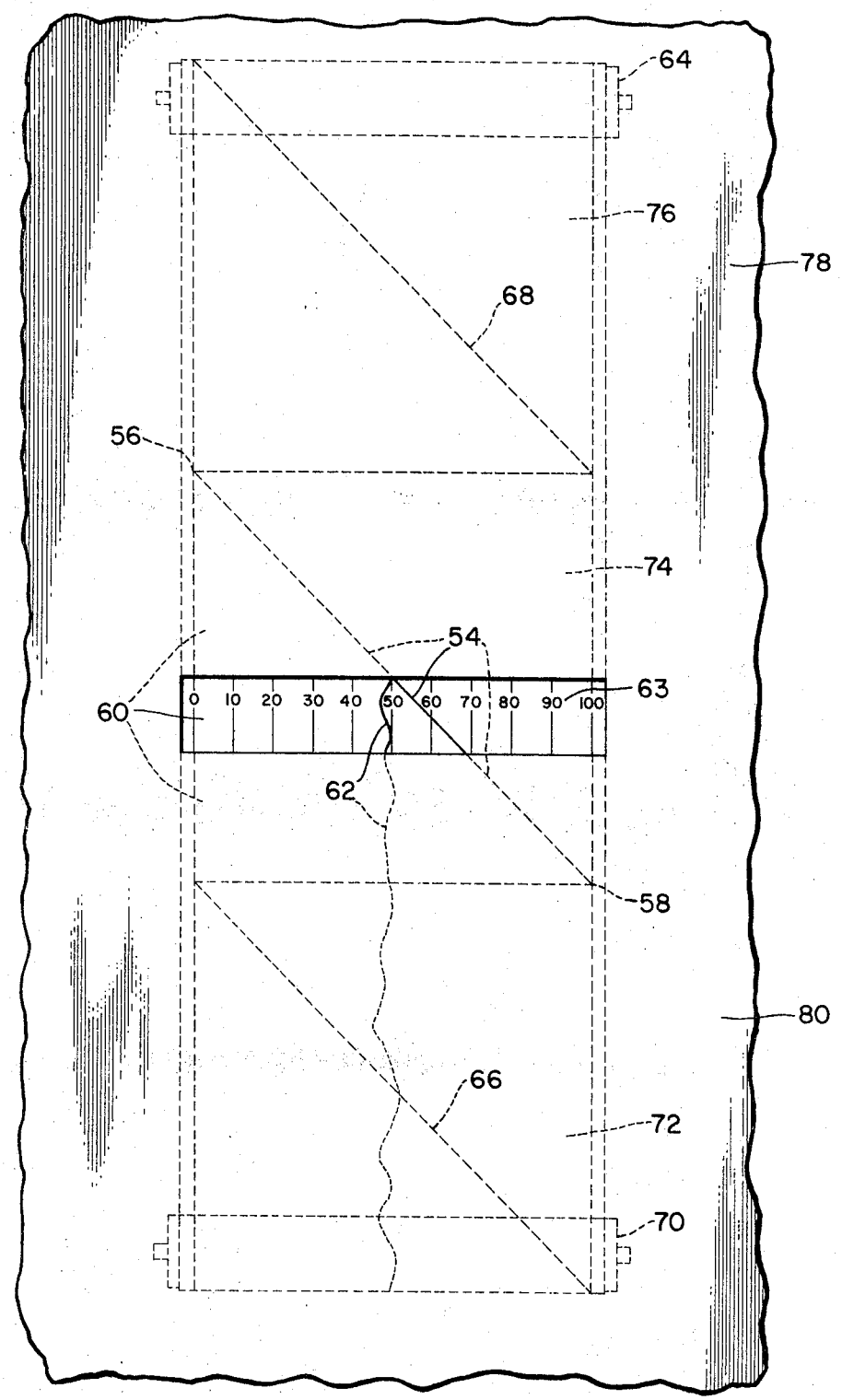

3,556,564
Patented Jan. 19, 1971

3,556,564
INDICATING APPARATUS
Paul A. Aldinger, Warminster, Pa., assignor to Honeywell Inc., Minneapolis, Minn., a corporation of Delaware
Filed Oct. 1, 1968, Ser. No. 764,268
Int. Cl. B42d 15/00
U.S. Cl. 283—62                                    1 Claim

ABSTRACT OF THE DISCLOSURE

A sheet, such as a strip chart having a faint discernable diagonal line which will not obscure a record being recorded on the chart and which extends from one side portion of the chart along the chart to the other side portion of the chart as it passes through a series of spaced apart zero to one hundred percent of scale calibration numbers on the chart to provide a continuous visual indication of the percent of chart remaining on the unrecorded portion of the chart that is wrapped about a partially covered supply roll and to enable an operator to determine if uninterrupted recording over a preselected period of time on a single chart can be accomplished without being required to renew the chart and thereby cause loss of a portion of the record to occur.

---

Figure 1:
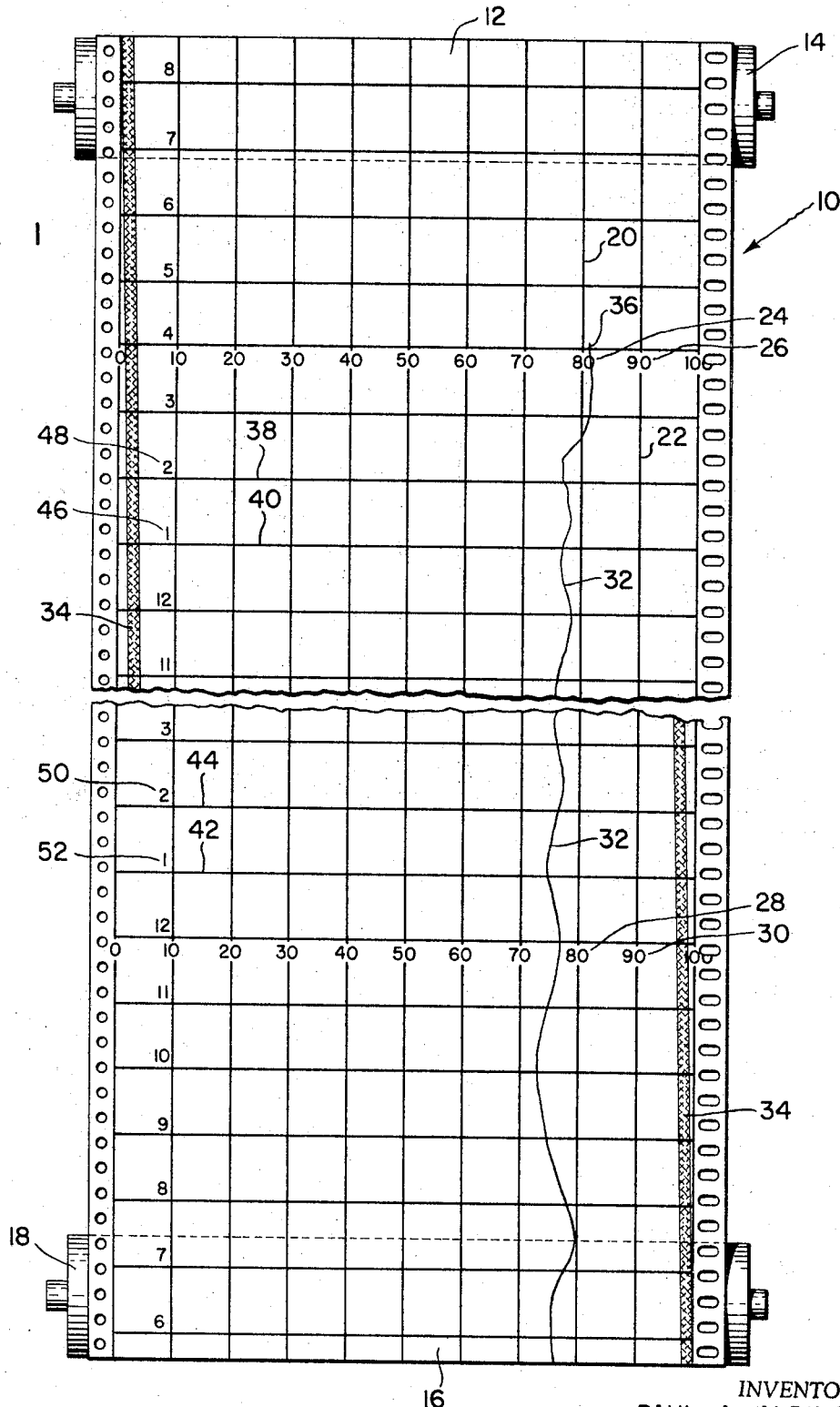

It is an object of the present invention to provide a sheet with a discernable mark thereon that will in turn provide a continuous visual indication at any point along the entire length of the sheet of the percent of sheet remaining between this point and a non visible end of the sheet.

It is often desirable to run a test to record the magnitude of a variable condition, such as temperature, on a strip chart over a continuous preselected period of time and without interruption.

One of the problems that has heretofore been encountered when attempting to get a continuous record of this type is that the end of the chart is reached before the recording period of time has been completed because there is no way of indicating how much a chart paper remains on the unrecorded portion of a partially covered supply roll. A record of the magnitude of the variable during the time it takes to replace this chart with a new one is therefore lost and another costly time consuming test must be made.

It is therefore another object of the present invention to provide a remedy for this problem by disclosing a sheet having a mark that extends from one of its side ends portions to its opposite side end portion in order to visually indicate to an operator when there is or is not a sufficient amount of chart remaining on a supply roll on which he can conduct an uninterrupted recording of a variable over some particular anticipated preselected period of time.

It is another object of the present invention to utilize a marked chart of the aforementioned type whose mark passes through numbers identifying zero to one hundred percent scale calibration lines on the chart so that an instantaneous visual reading of the amount of chart remaining between any point on the chart and the end of the chart can be readily ascertained at a distance from the chart.

It is another more specific object of the present invention to provide the aforementioned sheet of material with a mark that is in the form of a diagonal line extending from one side end portion of the sheet which may be wrapped about a supply spool to an opposite side end portion which may be simultaneously wrapped about a takeup spool.

It is still another object of the invention to provide a rolled sheet of material with the aforementioned type of diagonal marking for a strip chart which is clearly distinguishable and which does not interefere with the correct reading of a visual record of a condition being recorded on the chart as it is moved between the supply and takeup rolls.

It is still a more specific object of the present invention to provide a diagonal line of the aforementioned type on a chart that is constructed of a faint, pastel or half tone color and which is preferably of a wider construction than the record line of the magnitude of a variable that is recorded on this chart in order that this diagonal line will in no way obscure the record line being recorded thereon.

A better understanding of the present invention may be had from the following detailed description when read in connection with the accompanying drawing in which:

FIG. 1 is a view showing a sheet in the form of a chart having a mark extending diagonally from one end side portion of the chart to the opposite side end portion of the chart and FIG. 2 shows a modified form of the invention.

The sheet 10 as shown in the drawing is in the form of a chart having one of its end portions 12 thereof rolled about a supply spool 14 and its opposite end portion 16 rolled about a takeup spool 18.

The chart 10 is marked with a series of spaced apart calibration lines e.g. 20, 22 which extend along the length of the chart between its end portions 12, 16. The numbers e.g. eighty, ninety on the chart identified by reference numerals 24, 26, 28, 30 are shown at different portions on the chart and represent the selected percent of full scale values along which a pen or other recording medium, not shown, travels to inscribe a record line 32 thereon as the chart is unwrapped from the supply spool 14, and while it is simultaneously wrapped onto the takeup spool 18 by a conventional chart roll driving means, not shown.

A discernable mark 34 is shown extending in a diagonal direction from a side at one end portion 12 of the chart 10 that is wrapped on a supply spool 14 to a side at the opposite end 16 of the chart 10 that is wrapped on the takeup spool 18.

If it is desired to know how much chart remains in rolled form on the supply spool 12 it is merely necessary to visually determine which of the percent of full scale zero to one hundred calibration numbers the diagonal line 34 is passing through at any point along the chart 10. For example, it may be desired to know the exact percent of chart still remaining on the supply roll 14 when the record line 32 being recorded at 38 on the chart 10 is reached. By observing the chart 10 it can be seen that when the record line 32 is at location 36 on the chart the diagonal line 34 is shown passing through the two percent mark at the left side of the chart 10. This immediately indicates to the operator that there is only two percent of a known length of chart 10 remaining on the supply spool 14 to be used up before he will reach its end and then be required to discontinue the recording of a record thereon while it is replaced with a new chart.

It should also be understood that other types of plain non-lined or unmarked sheets made of cloth, paper, plastic or other similar materials may beneficially employ a diagonal mark extending from one side end portion to an opposite end portion for providing a continuous visible gauge of the percent of sheet remaining at any point between this point and a wrapped end 12 of the sheet as this end of the sheet is rolled off of the supply spool 14 onto a takeup spool 18 by merely observing the position across the width of the sheet in which the diagonal line 34 is located. If the line is located i.e. half way across the sheet then fifty percent of the sheet still remains on the supply roll 12 on which a record can be inscribed.

The diagonal line 34 on the chart 10 thus serves a very useful purpose, namely to visually inform the operator at any point along the chart 10 whether or not the length of chart 10 that is at that time available to him is of a sufficient length to enable him to continuously record the magnitude of a variable thereon for a desired preselected length of time without reaching the end of the chart and causing the record to be discontinued.

The diagonal line 34 is preferably made of a fainter color than the calibration lines 20, 22, the numerals e.g. identified as 24–30, record line 32 and the time lines and numbers identified as 38, 40, 42, 44, 46, 48, 50, 52.

The diagonal line 34 is also of a half tone or pastel shade and is preferably made of a light pink color which is of a different density and greater width than the other recorded or calibrated lines on the chart.

Constructing the diagonal line 34 in the aforementioned manner enables the observer of such a chart to determine the distance at which this line is located across the width of the chart and hence the amount of chart remaining on the supply spool 14 from a remote position that may be as far as fifteen feet or more from the chart.

It should be noted that FIG. 2 illustrates another modified form of the invention in which the diagonal line 54 extends between any two opposite side portions 56, 58 of a strip chart 60 along which a test record 62 of a magnitude of a variable condition is to be recorded. By observing the distance at which this diagonal line 54 is located across the width of the chart on the number on the percent of chart scale 63, an operator can readily determine at any time during the recording of the test record, before the test recording is completed, the amount of chart remaining on the supply roll 64 on which a record can be recorded.

FIG. 2 is provided with additional diagonal lines 66, 68 along which test recordings can be made and also shows a takeup spool 70 on which the various segments 72, 74, 76 of the chart 60 can be wrapped.

FIG. 2 also shows the spools 64, 70 and large portions of the chart 60 covered by the casing portions 78, 80.

The chart having a diagonal line thereon is therefore not only useful in determining if there is a sufficient amount of chart available on which a particular time test record can be made without reaching the end of the chart but is also useful in determining at a glance the length of unrecorded chart that is available before a preselected time test record on a chart will be completed.

It is often desirable to make copies of a portion of a segmental portion of the chart on which a test record of a condition has been made in the aforementioned manner. It is desirable that Xerox or ozalid copies of this record be made without the inclusion of the diagonal line thereon. It has been found that a fast drying ethylene glycol base ink preferably of a red color that has been thinned with ethyl alcohol to produce a faint discernable diagonal ink line on the original chart will meet this requirement and therefore not cause such a line to be reproduced on Xerox or ozalid prints which are made of the record recorded on the chart.

The embodiments of the invention in which an exclusive property or privilege is claimed are defined as follows:

1. An improvement in a strip chart construction for use in an automatic recording apparatus having numbered calibration lines extending in substantially transverse and longitudinal directions thereon to provide a means of visually identifying the magnitude of a variable being recorded in recording line form on the chart by a recording means, said improvement comprising the employment of a discernable mark extending from one side of the chart that is selectively spaced inwardly from one end of the chart from a lateral portion of the chart along which said recording means starts to record a recording line thereon through said calibration lines to an opposite side of the chart that is selectively spaced inwardly from the other end of the chart at a lateral portion thereof where the recording line of said recording means is to be terminated, said mark being comprised of a non-reproducible fast drying colored ethylene glycol base ink containing ethyl alcohol and being of a fainter color and greater width than its associated calibration and recording lines to thereby indicate the percent of chart remaining between any portion of the record line and the lateral portion of the chart at which said recording line is to be terminated and being characterized in that the mark is non-reproducible on Xerox or ozalid prints which are made of the record and calibration lines on the chart.

References Cited

UNITED STATES PATENTS

| | | | |
|---|---|---|---|
| 1,491,374 | 4/1924 | Babson | 40—95 |
| 1,935,970 | 11/1933 | Wooster et al. | 283—62X |
| 2,033,926 | 3/1936 | Decker | 40—95 |
| 2,077,242 | 4/1937 | La Pierre | 283—1 |
| 2,195,782 | 4/1940 | Perritt | 40—95 |

LAWRENCE CHARLES, Primary Examiner